March 1, 1966 W. C. PULVER 3,237,756
CONVEYOR STRUCTURE
Filed March 9, 1961 5 Sheets-Sheet 1
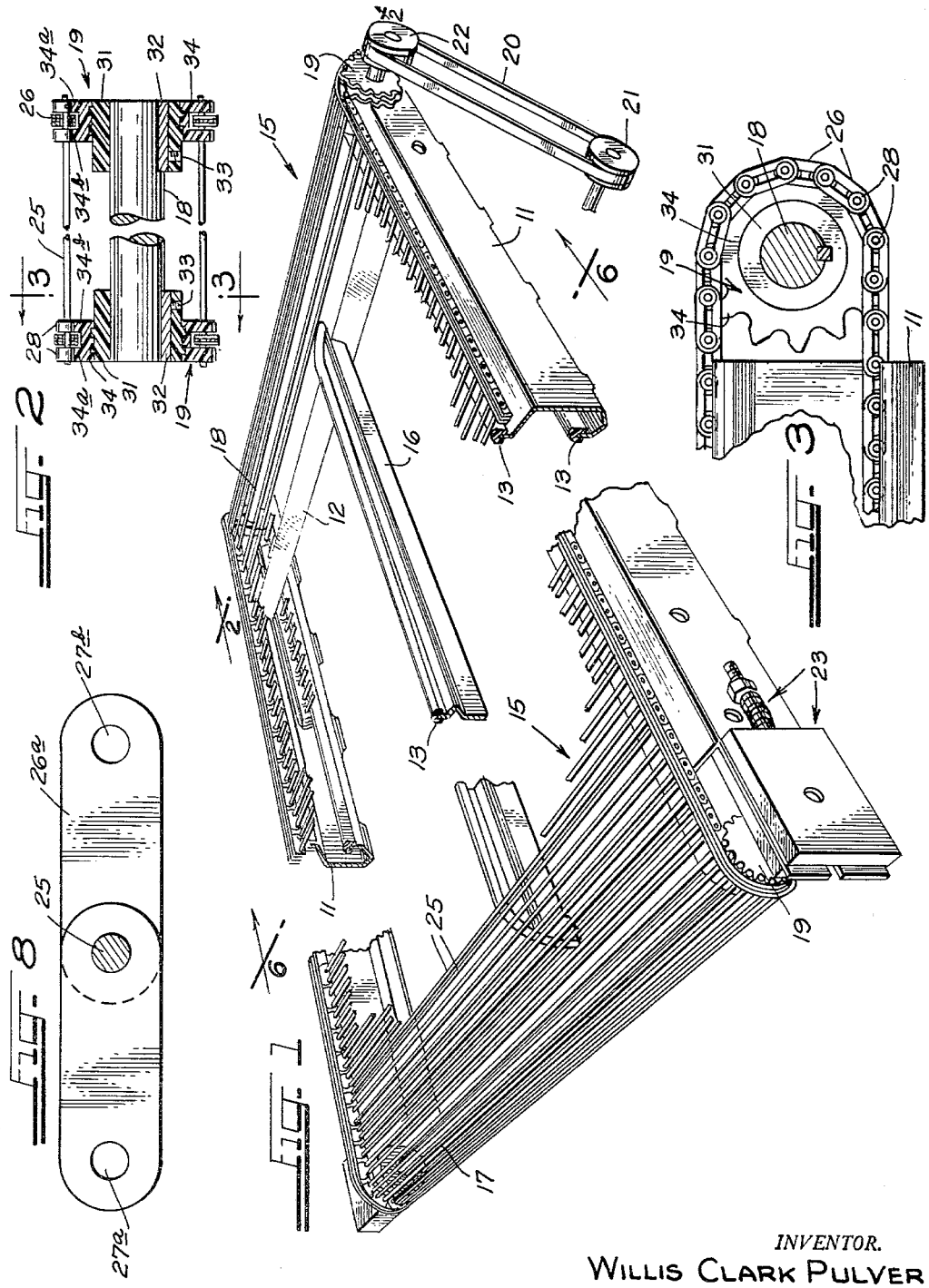
INVENTOR.
WILLIS CLARK PULVER March 1, 1966 W. C. PULVER 3,237,756
CONVEYOR STRUCTURE
Filed March 9, 1961 5 Sheets-Sheet 2
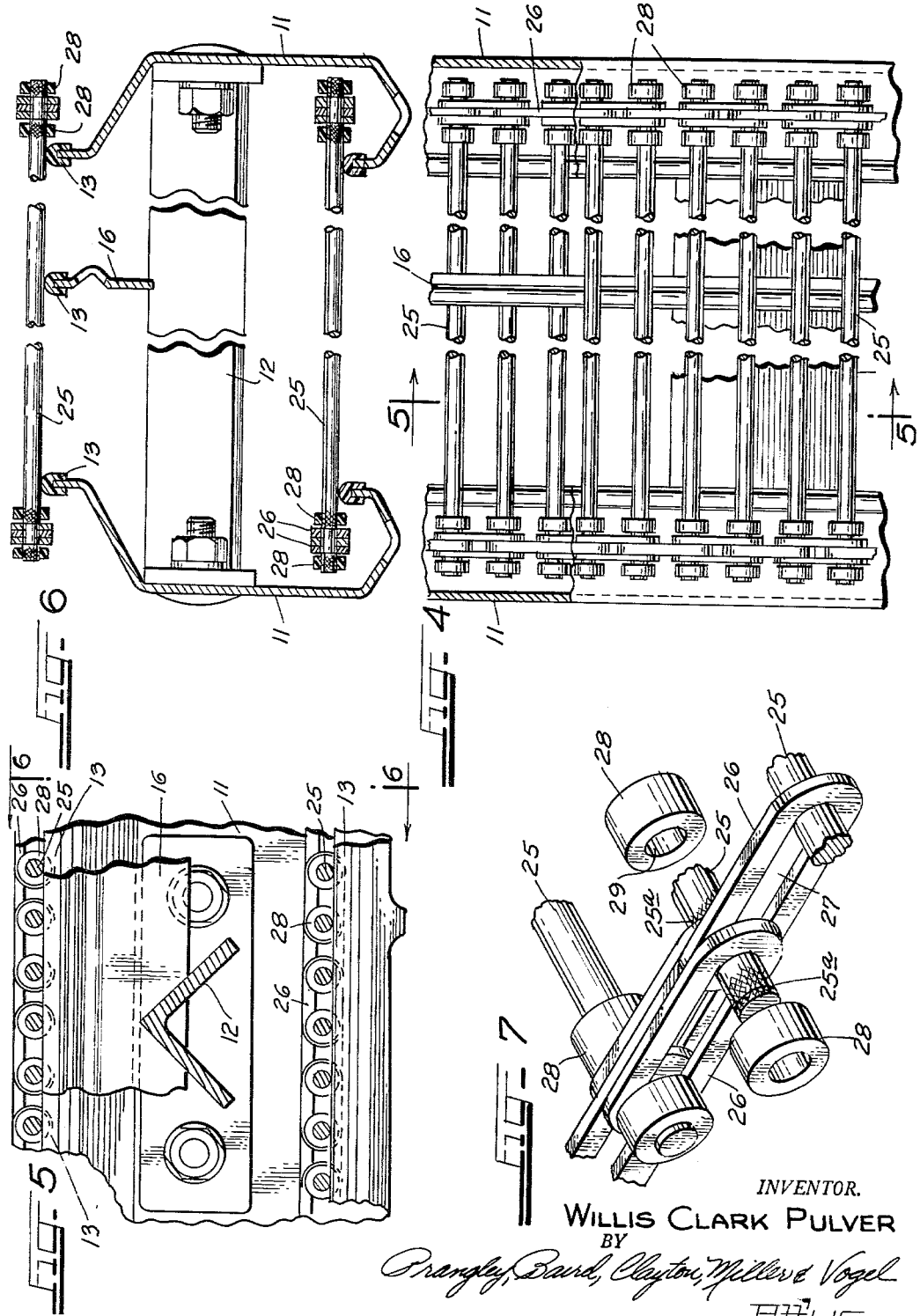
INVENTOR.
WILLIS CLARK PULVER March 1, 1966  W. C. PULVER  3,237,756
CONVEYOR STRUCTURE
Filed March 9, 1961  5 Sheets-Sheet 3
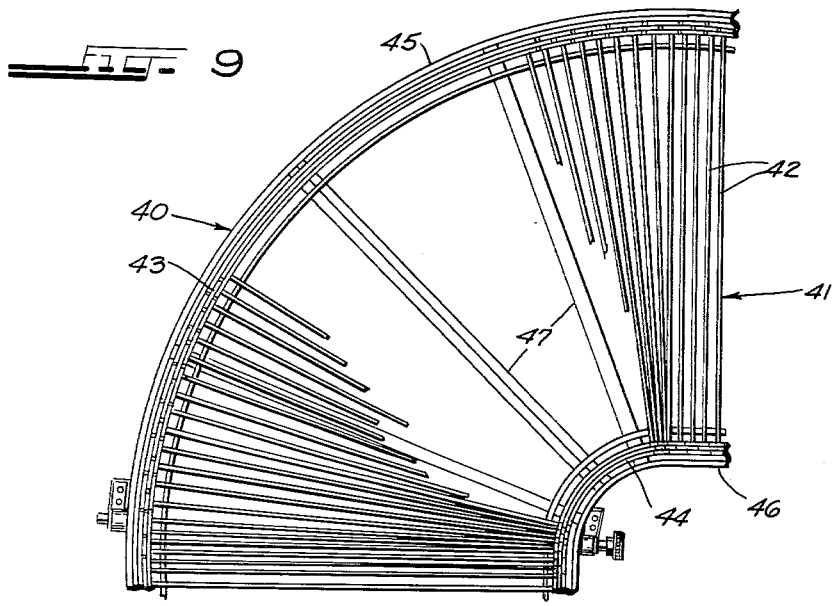
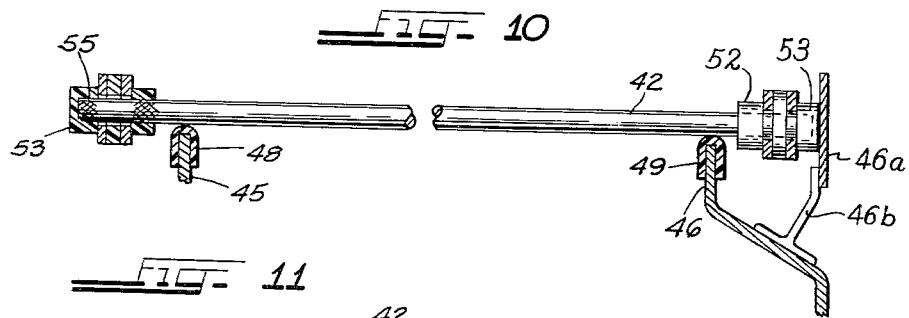
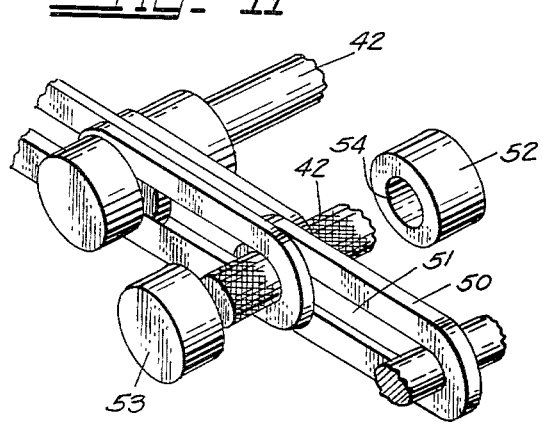
INVENTOR.
WILLIS CLARK PULVER March 1, 1966　　　W. C. PULVER　　　3,237,756
CONVEYOR STRUCTURE
Filed March 9, 1961　　　　　　　　　　　　　　5 Sheets-Sheet 4
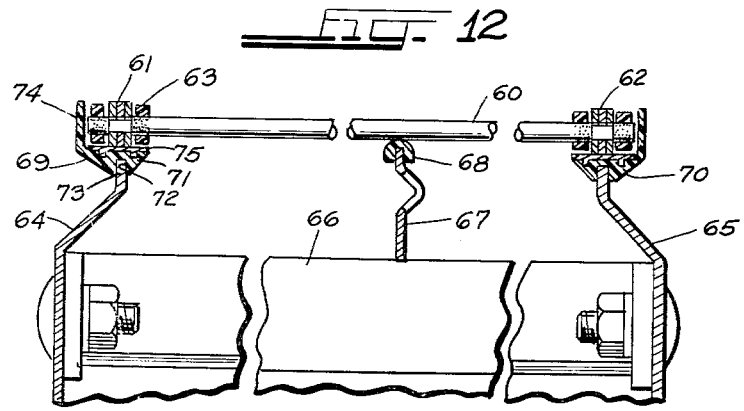
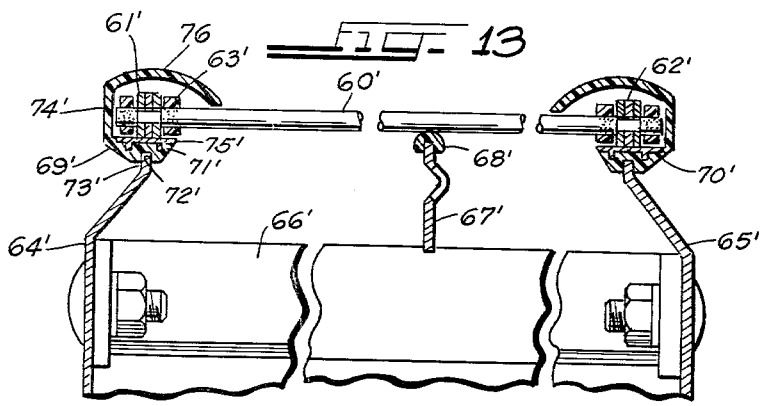
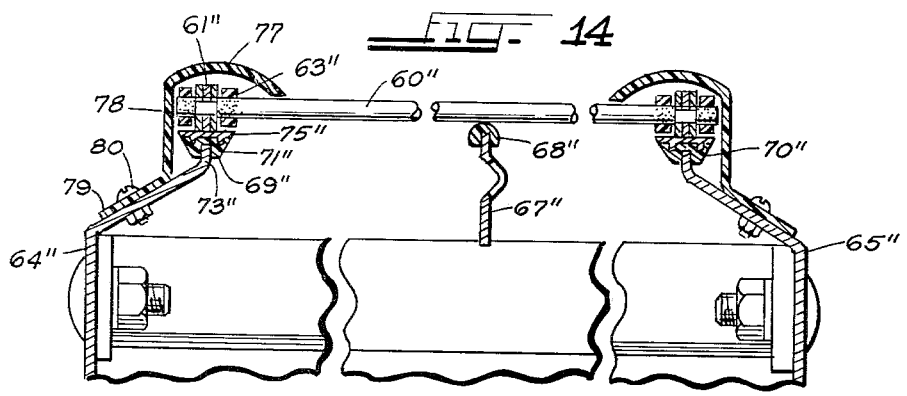
INVENTOR.
WILLIS CLARK PULVER
BY
Brangley, Baird, Clayton, Miller & Vogel
ATT'YS.

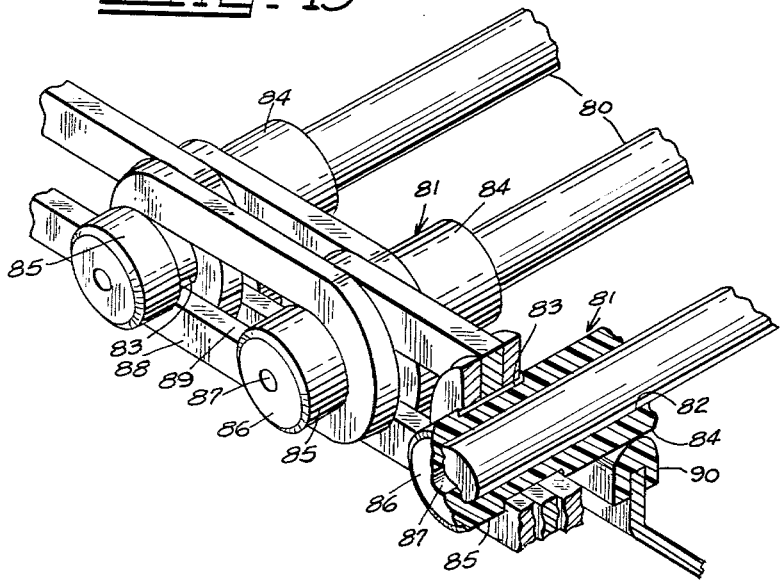
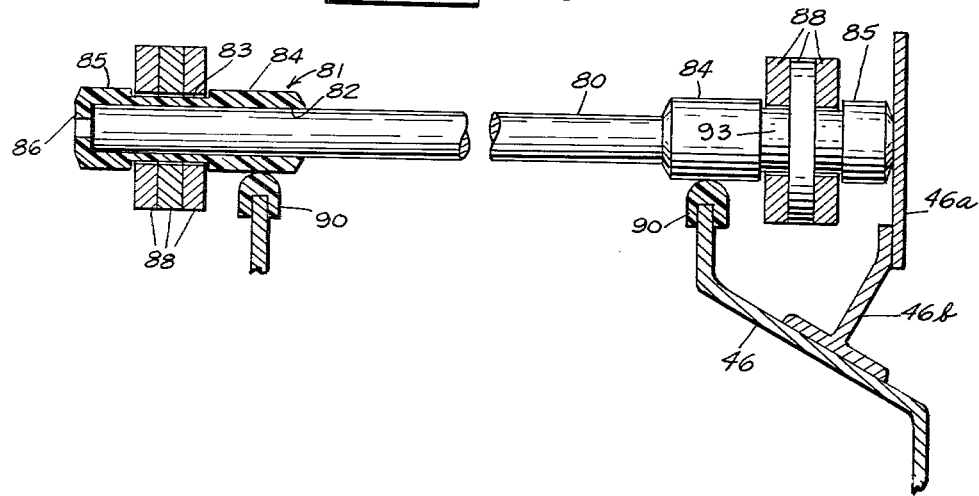

United States Patent Office 3,237,756
Patented Mar. 1, 1966

3,237,756
CONVEYOR STRUCTURE
Willis Clark Pulver, Oak Lawn, Ill., assignor to Velten
& Pulver, Inc., Chicago Ridge, Ill., a corporation of
Illinois
Filed Mar. 9, 1961, Ser. No. 94,489
6 Claims. (Cl. 198—195)

This invention relates to conveyor apparatus, and more particularly to a chain conveyor and drive arrangement thereof, and the present application is a continuation-in-part of my co-pending application Serial No. 7,443, now abandoned filed February 8, 1960.

A chain conveyor of the type herein considered includes a flight or apron comprising a plurality of individual rods or slats respectively connected at the opposite ends thereof to a pair of endless chains that move the bars along a predetermined path. The chains, in turn, are actuated by motor-driven sprockets operatively associated therewith. Apparatus of this general type is disclosed in Patent No. 2,753,039, granted July 3, 1956, and in pending application, Serial No. 670,720, filed July 9, 1957, by Willis Clark Pulver, now Patent No. 2,969,870; and the present invention is an improved form of such apparatus.

An object of this invention is to provide a conveyor of the type described, in which the rods or bars comprising the apron require no machining and may be of uniform diameter throughout their entire lengths whereby the conveyor is less expensive than it would be were such machining required.

Another object is that of providing carrier chains for such bars comprising links having either an elongated slot through which such bars extend, which permits relative movement between the bars and links along the length of the latter, or a pair of longitudinally spaced openings through which such bars extend; and in which the bars are secured in position with respect to such links by collars and cooperable with the drive sprockets of the apparatus.

Still another object is in the provision of a conveyor structure of the character described, in which the various sprockets each comprise a pair of transversely spaced rows of teeth adapted to straddle the links of the conveyor chain asociated therewith, and in which such rows of teeth respectively cooperate with a pair of transversely spaced collars carried by each of the apron bars on opposite sides of the conveyor chain to anchor the bar thereto, Preferably, the collars are formed of a material having a low coefficient of friction, and may be formed of a plastic such as nylon.

Yet another object is that of providing a conveyor structure of the type described, in which each of the drive sprockets engages the apron bars at spaced longitudinal locations therealong, with the result that longitudinal bowing of such rods which ordinarily occurs when such rods are driven at only two longitudinally spaced locations by a pair of sprockets is obviated.

A further object is to provide a conveyor structure of the type described, in which the apron bars are respectively supported at longitudinally spaced locations therealong, and in which two of such locations comprise support pads respectively disposed adjacent the end portions of the rods and slidably engaged by the links of the drive chains—such support pads preferably having a relatively low coefficient of friction and being of either unitary or complex construction.

Still a further object is in the provision of a chain conveyor having a flight or apron comprised by a plurality of individual rods or slats respectively connected adjacent the opposite ends thereof to a pair of endless chains that advance the bars along a predetermined path, and in which guard structures respectively cover or enclose the chain-equipped end portions of the rods so as to permit articles to be removed therefrom longitudinally along the bars without engagement with such chains.

Yet a further object is to provide an improved conveyor structure of the type described, which is rugged in construction, reliable in operation and economical to manufacture; in which the driving forces transmitted by the sprockets to the apron bars to move the same and the lading carried thereby are distributed over relatively wide areas so as to obviate localized force concentration; and in which the frictional forces developed between the various sprockets and carrier chains and between the carrier chains and bars are minimized.

The invention, both as to its organization and method of operation, together with further objects and advantages thereof, will best be understood by reference to the following specification, taken in connection with the accompanying drawings, in which:

FIGURE 1 is a perspective view, partially broken away, of conveyor apparatus incorporating the present invention;

FIGURE 2 is a transverse sectional view, partially broken away, taken in the direction of the arrows along the line 2—2 of FIGURE 1;

FIGURE 3 is a vertical sectional view taken in the direction of the arrows along the line 3—3 of FIGURE 2;

FIGURE 4 is a broken top plan view of the conveyor apparatus shown in FIGURE 1;

FIGURE 5 is a broken longitudinal sectional view taken in the direction of the arrows along the line 5—5 of FIGURE 4;

FIGURE 6 is a transverse sectional view, partially broken away, taken in the direction of the arrows along the line 6—6 of FIGURE 5;

FIGURE 7 is a perspective view, partially exploded, illustrating the linkage incorporated in the conveyor apparatus of FIGURES 1 to 6;

FIGURE 8 is a side elevational view of an alternative form of link which may be employed in place of the links specifically illustrated in FIGURE 7;

FIGURE 9 is a broken top plan view of a modified conveyor;

FIGURE 10 is a transverse sectional view taken through the apparatus of FIGURE 9;

FIGURE 11 is an enlarged, broken perspective view of the linkage employed in the conveyor shown in FIGURE 9;

FIGURE 12 is a broken transverse sectional view illustrating still another modified form of conveyor;

FIGURE 13 is a broken transverse sectional view illustrating yet another modified form of conveyor;

FIGURE 14 is a broken transverse sectional view showing a still further modified form of conveyor;

FIGURE 15 is an enlarged fragmentary perspective view similar to FIGS. 7 and 11 but partially broken away to show a further modification of the conveyor structure; and FIGURE 16 is an enlarged transverse cross-sectional view of the conveyor, similar to FIG. 10, but showing in further detail the structure illustrated in FIG. 15.

As indicated above, the present invention is specifically directed to the conveyor apron or flights and drive mechanism therefor and to support arrangements therefor, and accordingly, the frame of the conveyor apparatus illustrated in the drawings, and other portions of the conveyor apparatus which do not of themselves constitute features of the present invention, are described only briefly herein.

The frame of the illustrated machine includes a pair of transversely spaced, substantially parallel side members 11 which are rigidly connected to each other by cross-bars 12 preferably in the form of angle irons bolted or otherwise anchored to the members 11, as shown best in FIGURE 5. Each of the side members 11 is provided with upwardly turned top and bottom edge portions covered by bearing members 13, the latter preferably being of a low friction, plastic material, such as nylon. As is clearly illustrated in FIGURES 1 and 6, the upper bearing members 13 extend along the length of the sides 11 and support the upper work section of an endless conveyor flight or apron 15; and similarly, the lower bearing members 13 extend along the length of the sides 11 in respective vertical alignment with the upper bearing members, and support the lower or return section of the same conveyor flight. Where the conveyor apparatus is of substantial width, one or more intermediate supports 16 for the conveyor flight may be provided, and preferably each such support will be equipped with a bearing member 13. Such intermediate supports may be supported on the crossbars 12, as is apparent in FIGURES 1 and 6.

A pair of transversely extending shafts 17 and 18 are rotatably supported by the side members 11 at the opposite ends thereof, and each of these shafts is equipped with a pair of transversely spaced sprocket wheels 19 which are employed in moving the conveyor apron along a predetermined path. In the specific structure illustrated, the shaft 17 and the sprockets 19 carried thereby constitute an idler composition; while the shaft 18 is splined to each of the sprockets 19 associated therewith and is rotatably driven by any suitable means as, for example, a pulley belt 20 and associated pulley wheels 21 and 22, the first of which may be connected to a motor (not shown). Preferably, the idler shaft 17 is supported at each of its ends for longitudinal adjustment along the side members 11 so as to afford selective control over the tension of the conveyor flight. Exemplary adjusting mechanism is designated with the numeral 23 in FIGURE 1, and includes a bearing block movable longitudinally with respect to the side members 11 and spring biased toward the left as viewed in FIGURE 1 to maintain a resilient tension in the conveyor flight. It will be appreciated that a screw adjustment is included to afford selective change in the biasing force provided by the spring.

The conveyor flight or apron comprises a plurality of rods or bars 25 of cylindrical cross section, and such bars have a relatively uniform diameter throughout their lengths. The bars are oriented in longitudinally spaced, substantially parallel relation and extend transversely of the apparatus from one side member 11 to the other. As seen most clearly in FIGURE 7, each of the bars 25 is connected at the opposite ends thereof to a pair of endless carrier chains, each of which comprises a plurality of links 26. The links are arranged in alternate interconnected groups, the first group consisting of a pair of links arranged in side-by-side parallel relation, and the second group comprising one such link interposed between the parallel side-by-side links of the first group.

Each of the links 26 is provided with a centrally disposed, longitudinally elongated slot 27 adapted to freely pass the bars 25 therethrough; and it will be noted in FIGURE 7 that a bar 25 is employed in securing the respectively adjacent groups of links to each other. It will also be noted that the slotted links 26 permit relative longitudinal movement between the bars 25 and links, and such a configuration is desirable particularly where the conveyor is circular or includes turns along the length thereof. Each of the bars 25 is secured in position with respect to the carrier chains, and more particularly the links 26 thereof, by collars 28 carried by each bar on opposite sides of each of the chains. Thus, each bar 25 has two pairs of collars 28 mounted thereon.

The collars 28 are cylindrical and are provided with a centrally disposed bore 29 extending therethrough, and are fixedly located on the bar 25 by means of a press fit or by any other suitable and convenient means. Preferably, the collars 28 will be spaced so that some clearance is afforded between the facing surfaces of the collars 28 and the adjacent links 26 so as to minimize friction in the system and avoid binding during movement of the conveyor flight. It will be evident that the anchorage between the bars 25 and associated collars 28 must be sufficient to prevent lateral displacement of the bar with respect to the carrier chains in view of the magnitude of any transversely directed forces normally encountered by the bars and which would tend to displace the same. In this respect, each of the bars 25 (as shown best in FIGURE 7) may have roughened areas 25a disposed therealong which are oriented so as to receive the collars 28 thereon. Such roughened areas may take varied forms such as serrations, and in some instances the serrations or other roughening may be oppositely oriented—that is, extending generally toward each other—with respect to the two areas disposed along opposite sides of the respective chains so as to augment the gripping force which retains the collars 28 in proper position along the bars. Where nylon collars are used, such collars may be moistened as by steam treatment to sufficiently soften the collars for positioning thereof on the roughened areas of the respective rods.

As is seen best in FIGURE 2, each of the sprocket wheels 19 includes a hub 31 secured to the associated shaft (that is, shaft 18 in FIGURE 2) by any suitable means such as with a key 32 that prevents relative rotation therebetween. The hubs may be constrained against longitudinal movement along the shaft by set screws 33. The tooth-equipped portion 34 of each sprocket is preferably formed from a material having a low coefficient of friction, such as nylon, and may be secured to the associated hub 31 in any appropriate manner, as by means of a shrink fit. Each of the tooth-engaging portions 34 has a centrally disposed circumferential groove or channel dimensioned so as to freely pass the chain links 26 therethrough, and such channel is bordered along the edges thereof by the respective rows of sprocket teeth identified with the numerals 34a and 34b. As FIGURE 2 makes evident, the transversely spaced rows of teeth 34a and 34b are oriented so that they align with the associated pair of collars 28 anchoring the rods or bars 25 to the chain links, and the sprocket teeth engage such collars whereby the conveyor apron is moved along its predetermined path by the sprockets 19 associated with the drive shaft 18. Each of the sprockets 19 may be of complex construction, as shown most clearly in FIGURE 2, in which the hub 31 and rim or tooth-engaging portion 34 comprises separate components or the sprocket may be of integral construction throughout. Further, the hub 31 could be metal while the outer rim portion 34 is plastic, and in some instances it may be desirable to form the sprockets of materials other than plastic.

The specific sprocket structure described comprising the two rows of sprocket teeth is effective to distribute the forces developed between the sprockets and rods 25 over a relatively large area and thereby reduce stress concentrations. More pointedly, such forces are distributed along each side of the conveyor between the associated collars 28 and rows of sprocket teeth 34a and 34b. As a consequence, the application of the driving force to each bar 25 at four longitudinally spaced locations therealong substantially minimizes and usually obviates the tendency of such bars to bow along the length thereof, which occurs when the bars are driven at only two longitudinally spaced locations. Therefore, the bars may have less strength than those heretofore employed and, for example, may be aluminum rather than steel. Additionally, the effective strength of each bar is increased since the cross sectional areas thereof adjacent the drive chains need not be reduced as in prior constructions because the collars 28 are used to longitudinally locate the bars with respect to the drive chains. The collars 28 then perform the dual function of maintaining the bars 25 and chain links 26 in a predetermined relationship, and cooperate with the sprocket wheels to effect movement of the conveyor flight while defining a relatively low frictional engagement with the sprocket teeth and distributing the driving forces over a relatively large area.

A modified form of chain link is shown in FIGURE 8, and is designated with the numeral 26a. The links 26a differ from the links 26 only in that an elongated, longitudinally extending slot is not provided along the link, but instead a pair of longitudinally spaced openings 27a and 27b are included, and such openings are adapted to pass the rods 25 therethrough. The links 26a may be employed where the conveyor flight moves along a substantially linear path, while the links 26 are particularly useful where the conveyor is required to turn in its own plane or is circular.

A further modified construction is illustrated in FIGURES 9 through 11, and in this construction the conveyor is designed to include at least one 90 degree turn in the plane thereof as it advances along its predetermined path of travel. The conveyor is designated by the numeral 40, and includes a conveyor flight or apron 41 comprising a plurality of transversely extending bars or rods 42. The bars 42 are carried at the opposite ends thereof by chains 43 and 44; and the conveyor includes frame components 45 and 46 along the sides thereof, rigidly connected together by a plurality of transversely extending beams or channels 47. The frame members 45 and 46 have inwardly and upwardly extending edges, as shown in FIGURE 10, respectively covered with bearing elements 48 and 49 adapted to support the bars 42 in their travel. The conveyor 40 may be substantially the same in construction as the conveyor heretofore described and illustrated in its entirety in FIGURE 1, except that when the conveyor 40 is used solely as a turn unit, the sprockets 19 adjacent the inner radius of the turn may be of smaller diameter than those adjacent the outer radius and the length of the link units interconnecting the ends of the bars 42 at the inner radius may be shorter than the links employed along the outer radius.

Each of the carrier chains 44 and 45 comprises a plurality of links that may be identical to the links 26 heretofore described in detail, but for the purposes of specific identification the links are denoted by the numeral 50 and the longitudinally extending slots thereof by the numeral 51. The bars 42 are associated with and connected to the links 50 in the manner heretofore described, and are positionally located with respect thereto by collars 52 and 53. The collar 52 has a centrally disposed bore 54 extending therethrough and is structurally and functionally the same as the collars 28 heretofore described, and therefore are carried by the bars 42 along the inner side of the links 50 and are fixedly located along the associated bars.

The collars 53 are in the form of caps in that they are closed at one end and therefore cover the outer end portions of the associated bars 42. Thus, the bore 55 provided in the collar 53 does not extend completely therethrough, as is evident especially in FIGURE 10. The collars 53 are fixedly related to the respectively associated bars 42 in any suitable manner as, for example, by means of a press fit. Thus, the collars 52 and 53 locate and anchor the bars 42 associated therewith with the chain links 50, and prevent transverse displacement of the bars relative to the chain links.

The caps or collars 53 are used at least on the ends of the bars 42 which are adjacent the smallest radius of the turn negotiated by the bars, for the closed ends of the collars provide a bearing surface adapted to engage and ride along any suitable guide member that may be located along the smaller radius of the turn. Such a guide member is shown at 46a in FIG. 10, the guide member being held rigidly in fixed position by means of brackets 46b, or the like, which may be welded or otherwise secured to the adjacent frame member 46. Thus, the collars 53 afford a relatively low friction bearing surface and protect the ends of the bars. It will be appreciated that the links 50 permit the bars 42 to move with respect to the links, whereupon the bars assume radial orientations when moving through the turn defined along the conveyor and, as in the prior described conveyor embodiment, the collars 52 and 53 are preferably spaced slightly from the links so as to obviate binding thereof and to afford some transverse play in the rods.

It will be apparent that in assembling the rods, links and collars in either embodiment of the invention, the innermost collars (that is, collar 52 in the structure shown in FIGURES 9 through 11) will first be forced onto the rods and properly located therealong. Next, the links will be positioned on the bars, and thereafter the outer collars (that is, collar 53 in the structure shown in FIGURES 9 through 11) will be forced onto the bars. The bars, links and collars are then properly associated and connected and, as brought out hereinbefore, the collars are located so that they will engage the respective rows of sprocket teeth when brought into adjacency therewith.

In the modified structure illustrated in FIGURE 12, the conveyor flight or apron has the same construction as that already described, and therefore comprises a plurality of bars 60 respectively connected adjacent the ends thereof to drive chains 61 and 62 by a plurality of collars 63. The structure also provides spaced apart frame members 64 and 65 interconnected by beams 66 which may be secured to the frame members by any suitable means, such as the nut and bolt compositions illustrated. The bars 60 are medially supported by a centrally disposed frame element 67 carried by the beams 66; and as described before, the frame element 67 is preferably equipped with a nylon runner 68 which is actually engaged by the bars 60.

In the prior described conveyors, the end portions of the apron bars were supported inwardly of the drive chains and were directly engaged by the upper end portions of the frame members. In the present structure, however, the end portions of the bars 60 are supported by pads or platforms 69 and 70, respectively carried by the frame members 64 and 65 and engaging the links of the drive chains 61 and 62 rather than the apron bars 60. Each of the support pads extends along the length of the frame member associated therewith, and may be secured thereto by any suitable means. Considering specifically the pad 69, it has a body 71 provided with a slot 72 therealong that frictionally receives the upper end portion 73 of the frame member 64 therein. Preferably, the body 71 has an upwardly extending wall portion 74 formed integral therewith which runs along the length thereof and provides a shield along one end of the bars 60, and serves to limit lateral displacements of such bars.

The pad 69 may be formed of any suitable material such as plastic, and may have the specific form shown in which an insert 75 extends along the upper surface of the body 71 and actually engages the chain 61. Such an arrangement permits the use of an insert 75 having good wearing characteristics and also a relatively low coefficient of friction, and another material for the remainder of the pad having certain other characteristics. For example, the insert 75 may be formed of nylon while the body 71 and its wall 74 may be formed of a relatively inexpensive material such as polyethylene and polypropylene. It will be apparent that the support pad 70 has precisely the same construction as that of the pad 69, and therefore it need not be described in specific detail.

Considering now the modification illustrated in FIGURE 13, the construction is precisely the same as that described in connection with the conveyor illustrated in FIGURE 12 with one exception, and therefore the same numerals are employed to identify the corresponding parts except that each numeral is primed. The singular exception referred to is that the upwardly extending runner or wall portion of each support pad curves over the associated end portions of the apron bars and corresponding drive chain and collars and down into adjacency with the bars. Thus, more specifically, the wall portion 74' of the support pad 69' has a cover element 76 formed integrally therewith, and this cover element extends inwardly over the drive chain 61' and associated collars 63' and terminate adjacent the bars 60'. Preferably, a slight spacing (for example, about the thickness of a sheet of paper) is provided between the bars 60' and cover element 76.

It will be apparent that the support pad 70' has exactly the same construction as the support pad 69', and the purpose and function of the two cover elements is to shield the respectively associated drive chains, etc., from engagement by articles supported upon the bars 60', and especially when such articles are removed from the bars by drawing or pulling such articles along the length of the bars toward the ends thereof. It has been found that where conveyors of the type considered herein, which are particularly useful in bakeries, are unloaded it is quite common to manually remove articles therefrom by personnel positioned along the sides of the conveyor. Such worker tends to pull the articles toward him by sliding the same along the bars 60', and as a consequence too frequently such articles are moved into engagement with the drive chains. The cover elements 76 will prevent this occurrence.

The modified construction shown in FIGURE 14 is substantially the same as those heretofore described in connection with FIGURES 12 and 13, and therefore the corresponding elements are designated with the double-primed equivalent of the prior numerals. The departure in the structure of FIGURE 14 is that each of the support pads does not have an integral runner or wall element extending upwardly therefrom. Rather, the cover element 77 is equipped along the outer edge thereof with a downwardly extending runner or wall element 78 that terminates in an outwardly inclined segment 79 secured to the correspondingly inclined segment of the frame member 64" by a nut and bolt composition 80. The cover member provided along the opposite side of the conveyor is exactly the same as the cover 77, and therefore a specific description thereof will not be included. Further, since the cover elements 77 perform the same function as the cover elements 76 heretofore described, an additional description of such function is unnecessary.

The modification of the conveyor structure shown in FIGS. 15 and 16 may be utilized in all forms of the conveyor described above, although for purposes of simple illustration the modification has been shown embodied in a conveyor construction similar to those illustrated in FIGS. 1 to 6 and 9 and 10. In this modification the conveyor apron is comprised of a plurality of cylindrical rods or bars 80, the opposite ends of which are provided with elongated plastic sleeves which may be formed, for example, from nylon. Each sleeve 81 in the form illustrated in FIG. 15 is a unitary or single piece item provided with a cylindrical axial bore 82 that is forced or press-fitted onto the end of a rod 80, it being understood that the opposite ends of all of the rods 80 are so provided with the sleeves. The outer surface of each sleeve intermediate its ends is provided with an annular recess or groove 83 so that the opposite end portions of the sleeve provide inner and outer collar-like portions 84 and 85 of greater diameter than the cylindrical bottom of the intermediate recess 83. The outer end of each sleeve 81 is closed by an end wall 86 having an axially disposed opening 87 therein through which the air may be expelled from the bore 82 of the sleeve as it is pressed onto the end of a rod.

As seen in FIG. 15, the links 88 of the chain of links at each end of the rods 80 ride in the cylindrical recesses 83 of the sleeve 81, it being understood that the links 88 may be similar to the links 26 previously described but provided with elongated slots 89 that are wider than the slots 27 of the links 26. In this regard, it will be noted from FIG. 7 that the slots 27 of the links 26 are slightly greater in width than the diameter of the rods 25, whereas the slots 89 of the links 88 are slightly wider than the diameter of the cylindrical bottom of the recess 83.

In assembling the structure of FIG. 15 the sleeves 81 are pressed onto the opposite ends of the rods 80 and the links 88, with their slots 89 spread apart, are slipped over the end collar-like portions 85 and into position in the recesses 83, whereupon the sides of the links are forced toward each other to restore the slots 89 to their normal width shown in FIG. 15. Having been received on the rods 80, the presence of the rods within the sleeves will rigidfy the sleeves and positively prevent withdrawal of the links therefrom, and in each case the collar-like end portions 84 and 85 of the sleeves act in the same fashion as the previously described collars 28 and 52 in that they prevent movement of the links in the axial direction of the rods and prevent axial movement of the rods with respect to the links. Similarly, the collar-like end portions 84 and 85 of the sleeves, like the collars 28 and 52, are received by the double sets of teeth 34 of the conveyor drive sprockets for propelling the conveyor.

In addition to providing a superior conveyor construction that is easy to assemble and has a superior drive arrangement with a minimum tendency to bend or flex the rods 80, the recessed portions of the sleeves 81 provide excellent bearing surfaces for the links 88 and permit the rods 80, if desired, to be formed of aluminum or other light metal. Since the rods may be of straight cylindrical form throughout their lengths, they may be very inexpensively fabricated without machining. Furthermore, inasmuch as the links do not themselves touch or wear directly upon the rods, the ends of the rods need not be hardened and they will not become discolored from wear, as has been the case heretofore, particularly when aluminum rods have been employed. Thus, there has been provided an excellent arrangement by which lightweight rods, having normally undesirable wear qualities, may be employed in a conveyor of the present general type. The use of lightweight metal rods of course reduces the dead weight of the conveyor apron or belt and permits the use of longer conveyor flights than would otherwise be the case.

The use of the sleeve 81 furthermore avoids the necessity for the rods 80 to ride directly upon the supporting rails or bearing members 13 or 48 and 49 in the manner illustrated in FIGS. 6 and 10. On the contrary, as shown in FIGS. 15 and 16, the inner collar-like portion 84 of each sleeve 81 may be somewhat longer than the outer collar-like portion 85 thereof and it rides directly upon supporting strips or bearing elements 90 which correspond to the bearing members 13, 48 and 49, thus avoiding all wearing contact of conveyor structural parts with the rods 80.

While there has been described what are at present considered to be the preferred embodiments of the invention, it will be understood that various modifications may be made therein, and it is intended to cover in the appended claims all such modifications as fall within the true spirit and scope of the invention.

I claim:
1. An endless conveyor structure comprising, a pair of spaced apart longitudinally extending frame members, a plurality of spaced apart elongated rods extending transversely of said frame members and providing a conveyor apron, a pair of transversely spaced apart endless chains interconnecting said rods, each of said chains including interrelated, substantially flat links disposed on edge and having openings therein through which the opposite end portions of said rods respectively extend, the bottom edges of certain of said links slidably engaging a resilient, non-metallic support pad on said frame member for vertically supporting the opposite end portions of said rods, each end portion of each of said rods being equipped with a pair of discrete, non-metallic collars fixed thereon and having a bore for receiving and gripping the respective end portions therein, said pair of collars providing spaced apart shoulders on opposite sides of said links directly engaged by the lateral surfaces of said links for preventing substantial lateral movement of said links, said frame members rotatably supporting a pair of spaced apart shafts extending transversely of said frame members, sprocket wheels mounted on said shafts each having a plurality of non-metallic, axially spaced apart pairs of teeth adapted to engage said pairs of non-metallic collars, said axially spaced teeth defining peripheral recesses in said sprocket wheels of a width greater than the width of said chain links interconnecting said rods, whereby as said teeth engage said pairs of collars said endless chains move between said teeth into said peripheral recesses in said sprocket wheels, and drive means operatively connected to one of said shafts for rotating the said sprocket wheels mounted thereon to advance said collars and said rods along a predetermined conveying path.

2. The conveyor structure set forth in cliam 1, wherein each of said frame members is provided with an upwardly extending flange having the free end thereof embraced by said support pad, and wherein said support pad is provided with an upwardly extending wall disposed adjacent to said end portions of said rods for limiting transverse displacement of such rods.

3. The conveyor structure set forth in claim 1, wherein a pair of cover elements are respectively associated with said support pads and are supported by said frame, each of said cover elements extending along the associated support pad and including an inwardly extending portion curved upwardly over said end portions and said chains and said collars and curved downwardly into adjacency with said rods inwardly of said collars for preventing transverse displacement into engagement with said chains of articles supported upon said rods.

4. An endless conveyor structure comprising, a pair of spaced apart longitudinally extending frame members, a plurality of spaced apart elongated rods extending transversely of said frame members and providing a conveyor apron, a guide member extending along one of said frame members and disposed adjacent to one end of said rods, a pair of transversely spaced apart endless chains interconnecting said rods, each of said chains including interrelated links having openings therein through which the opposite end portions of said rods respectively extend, each end portion of each of said rods being equipped with a pair of discrete, non-metallic collars fixed thereon and having a bore for receiving and gripping the respective end portion therein, each of said pairs of collars providing spaced apart shoulders on opposite sides of said links directly engaged by the lateral surfaces of said links for preventing substantial lateral movement of said links relative to said rods, one of said collars of each of said pairs embracing and enclosing the tip of its associated rod and providing a non-metallic bearing surface for engaging said guide member to limit transverse displacement of said rod, said frame members rotatably supporting a pair of spaced apart shafts extending transversely of said frame members, sprocket wheels mounted on said shafts each having a plurality of non-metallic, axially spaced apart pairs of teeth for engaging said pairs of non-metallic collars, said axially spaced teeth defining peripheral recesses in said sprocket wheels of a width greater than the width of said chain links interconnecting said rods, whereby as said teeth engage said pairs of collars said endless chains move between said teeth into said peripheral recesses in said sprocket wheels, and drive means operatively connected to one of said shafts for rotating the said sprocket wheels mounted thereon to advance said collars and said rods along a predetermined conveying path.

5. An endless conveyor structure comprising, a pair of spaced apart longitudinally extending frame members, a plurality of spaced apart elongated rods extending transversely of said frame members and providing a conveyor apron, a pair of transversely spaced apart endless chains, each of said chains including interrelated links having openings therein through which the opposite end portions of said rods respectively extend, each end portion of each of said rods being equipped with a pair of resilient, non-metallic collars fixed thereon and having a bore for receiving and resiliently gripping said end portion, each of said pairs of collars providing spaced apart shoulders on opposite sides of said links directly engaged by the lateral surfaces of said links for preventing substantial lateral movement of said links relative to said rods, each end portion having a resilient, non-metallic cylindrical bearing element intermediate said spaced apart shoulders thereon formed integrally with said collars and engaging said interrelated links through said openings therein, said frame members rotatably supporting a pair of spaced apart shafts extending transversely of said frame members, sprocket wheels mounted on said shafts each having a plurality of non-metallic axially spaced apart pairs of teeth for engaging said pairs of non-metallic collars, said axially spaced teeth defining peripheral recesses in said sprocket wheels of a width greater than the width of said chain links interconnecting said rods, whereby as said teeth engage said pairs of collars to advance said rods said endless chains move between said teeth through said peripheral recesses in said sprocket wheels, and drive means operatively connected to one of said shafts for rotating the said sprocket wheels mounted thereon to advance said collars and said rods along a predetermined conveying path.

6. An endless conveyor structure comprising, a pair of spaced apart longitudinally extending frame members, a plurality of spaced apart elongated rods extending transversely of said frame members and providing a conveyor apron, a guide member extending along one of said frame members and disposed adjacent to one end of said rods, a pair of transversely spaced apart endless chains, each of said chains including interrelated links having openings therein through which the opposite end portions of said rods respectively extend, each end portion of each of said rods being equipped with a pair of resilient, non-metallic collars fixed thereon and having a bore for receiving and resiliently gripping the respective end portion therein, one of said collars in each of said pairs embracing and enclosing the tip of its associated rod and providing a non-metallic bearing surface for engaging said guide member to limit transverse displacement of its associated rod, the other of said collars in each of said pairs slidably engaging one of said frame members as said conveyor apron moves thereover, said pair of collars providing spaced apart shoulders on opposite sides of said links directly engaged by the lateral surfaces of said links for preventing substantial lateral movement of said links relative to said rods, each end portion having a resilient, non-metallic, cylindrical bearing element intermediate said spaced apart shoulders formed integrally with said collars and engaging said interrelated links through said openings therein, said frame members rotatably supporting a pair of spaced apart shafts extending transversely of said frame members, sprocket wheels mounted on said shafts each having a plurality of non-metallic axially spaced apart pairs of teeth for engaging said pairs of non-metallic collars, said axially spaced teeth defining peripheral recesses in said sprocket wheels of a width greater than the width of said chain links interconnecting said rods, whereby as said teeth engage said pairs of collars said endless chains move between said teeth into said peripheral recesses in said sprocket wheels, and drive means operatively connected to one of said shafts for rotating the said sprocket wheels mounted thereon to advance said collars and said rods along a predetermined conveying path.

References Cited by the Examiner

UNITED STATES PATENTS

| | | | |
|---|---|---|---|
| 796,947 | 8/1905 | Thomas | 198—194 |
| 1,451,613 | 4/1923 | Hodgkiss. | |
| 1,664,763 | 4/1928 | Webb | 198—193 |
| 1,724,150 | 8/1929 | Webb | 198—189 |
| 1,868,514 | 7/1932 | Anstiss | 198—193 |
| 2,158,622 | 5/1939 | Festenberg-Pakisch | 74—255 |
| 2,633,975 | 4/1953 | Koerber | 198—182 |
| 2,753,039 | 7/1956 | Velten et al. | 198—195 |
| 2,816,453 | 12/1957 | Frank et al. | 74—251 |
| 2,951,578 | 9/1960 | Hibbard | 198—189 |
| 2,969,870 | 1/1961 | Pulver | 198—195 |
| 2,986,387 | 5/1961 | Illing | 198—193 X |

FOREIGN PATENTS 547,145    8/1956    Italy.

OTHER REFERENCES 1,101,274, March 1961, German printed application.

SAMUEL F. COLEMAN, *Primary Examiner.*

JULIUS E. WEST, WILLIAM B. LA BORDE, ERNEST A. FALLER, *Examiners.*

A. SCHUETZ, R. HICKEY, *Assistant Examiners.*